(12) United States Patent  (10) Patent No.: US 8,709,300 B2
Domae et al.  (45) Date of Patent: Apr. 29, 2014

(54) PROCESS FOR PRODUCTION OF NICKEL OXIDE-STABILIZED ZIRCONIA COMPOSITE OXIDE

(75) Inventors: Kyosuke Domae, Fukui (JP); Takeshi Usui, Fukui (JP); Tadashi Yasui, Osaka (JP); Satoshi Watanabe, Osaka (JP)

(73) Assignee: Daiichi Kigenso Kagaku Kogyo Co., Ltd., Osaka-shi (JP)

( * ) Notice: Subject to any disclaimer, the term of this patent is extended or adjusted under 35 U.S.C. 154(b) by 239 days.

(21) Appl. No.: 13/058,091

(22) PCT Filed: Aug. 7, 2009

(86) PCT No.: PCT/JP2009/064014
§ 371 (c)(1),
(2), (4) Date: Feb. 8, 2011

(87) PCT Pub. No.: WO2010/016569
PCT Pub. Date: Feb. 11, 2010

(65) Prior Publication Data
US 2011/0133119 A1 Jun. 9, 2011

(30) Foreign Application Priority Data
Aug. 8, 2008 (JP) ................ 2008-206052

(51) Int. Cl.
*H01B 1/08* (2006.01)
*C01G 53/00* (2006.01)

(52) U.S. Cl.
USPC ............... 252/520.2; 252/520.21; 423/594.3

(58) Field of Classification Search
USPC ........ 252/520.2, 520.21; 423/594.3; 429/488, 429/489
See application file for complete search history.

(56) References Cited

U.S. PATENT DOCUMENTS

| | | | | |
|---|---|---|---|---|
| 5,993,988 A * | 11/1999 | Ohara et al. | ............. | 429/527 |
| 7,595,127 B2 * | 9/2009 | Seabaugh et al. | ............. | 429/486 |
| 7,968,609 B2 * | 6/2011 | Suciu | ............. | 516/98 |
| 8,288,053 B2 * | 10/2012 | Yonesato et al. | ............. | 429/479 |
| 2005/0019637 A1 | 1/2005 | Herman et al. | | |
| 2005/0064277 A1 | 3/2005 | Inagaki et al. | | |
| 2010/0021792 A1 | 1/2010 | Inagaki et al. | | |

FOREIGN PATENT DOCUMENTS

| | | | |
|---|---|---|---|
| CN | 1944275 A | * | 4/2007 |
| JP | 7-29575 A | | 1/1995 |
| JP | 2003-197219 A | | 7/2003 |
| JP | 2004-327278 A | | 11/2004 |
| JP | 2005-044811 A | | 2/2005 |

(Continued)

OTHER PUBLICATIONS

Negishi et al "Application of electrophoretic deposition technique to solid oxide fuel cells", Journ. Electrochem. Soc. 147(5) 1682-1687 (2000).*

(Continued)

*Primary Examiner* — Mark Kopec
(74) *Attorney, Agent, or Firm* — Westerman, Hattori, Daniels & Adrian, LLP

(57) ABSTRACT

The present invention relates to a nickel oxide-stabilized zirconia composite in which nickel oxide is dispersed uniformly, a process for readily producing the composite oxide, and an anode for a solid oxide fuel cell having excellent output characteristics.

More specifically, the present invention provides a nickel oxide-stabilized zirconia composite that is produced by sintering a mixture of nickel hydroxide and/or nickel carbonate and a hydroxide of stabilized zirconium.

1 Claim, 1 Drawing Sheet

(56) References Cited

FOREIGN PATENT DOCUMENTS

| JP | 2006-004874 A | 1/2006 |
|---|---|---|
| JP | 2006-188372 A | 7/2006 |
| JP | 2007-080542 A | 3/2007 |

OTHER PUBLICATIONS

Tosoh Advanced Ceramics/Zirconia Powders product datasheet (www.tosoh.com), no pub data.*
Riess et al "Mon-molecular adsorbed layers of water on YSZ . . . ", Electrochem Soc Proceed, Fall 2001.*
Barrera-Solano et al "Obtaining and Sintering Yttria Stabilized Zirconia . . . ", Journal of Sol-Gel Sci and Tech 2, 347-352 (1994).*
International Search Report of PCT/JP2009/064014, dated of mailing dated Sep. 25, 2009.
International Preliminary Report on Patentability (Form PCT/IPEA/409) of International Application No. PCT/JP2009/064014 dated Mar. 26, 2010 with Forms PCT/IB/373 and PCT/ISA/237.
Extended European Search Report dated Mar. 12, 2013, issued in European Patent Association No. 09805051.1 (7 pages).
Marinsek M et al., "Preparation of Ni-YSZ composite materials for solid oxide fuel cell anodes by the gel-precipitation method", Journal of Power Sources, Elsevier SA, CH, vol. 86, No. 1-2; Mar. 1, 2000, pp. 383-389; XP004194147.
Li, Y, et al., Preparation of Ni/YSZ materials for SOFC anodes by buffer-solution method, Materials Science and Engineering B, Elsevier Sequoia, Lausanne, CH, vol. 86, No. 2, Sep. 25, 2001, pp. 119-122, XP004296409.
Cheng, Ming-Yao et al., "Peculiar Properties on Novel Self-stabilized NiO-YSZ Nanocomposite Materials For Solid Oxide Fuel Cell Anode", Prepr. Pap.-AM. Chem. SOC., Div. Fuel Chem, Jan. 1, 2004, pp. 751-752, XP055054557.
Extended European Search Report dated Mar. 13, 2013, issued in European Patent Application No. 09805051.1 (7 pages).

* cited by examiner

PROCESS FOR PRODUCTION OF NICKEL OXIDE-STABILIZED ZIRCONIA COMPOSITE OXIDE

TECHNICAL FIELD

The present invention relates to a nickel oxide-stabilized zirconia composite oxide, a process for producing the same, and an anode for a solid oxide fuel cell comprising the same.

BACKGROUND ART

Conventionally, nickel oxide, and stabilized zirconia, whose crystal structure is stabilized, are used as the anode materials for solid oxide fuel cells. These materials are mixed in a process for forming an anode. In that case, the properties of the obtained anode largely depend on the properties of the material after being mixed.

For example, a nickel oxide in an anode is reduced from the nickel oxide state to a nickel metal by hydrogen gas, i.e., fuel, thereby to act as a conductor that efficiently conducts electrons produced in power generation, and as a decomposition catalyst for hydrogen gas. In this case, micronizing nickel and uniformalizing the distribution state thereof in the anode, namely, improving the nickel dispersibility, increases the specific surface area that can contribute as a catalyst. In addition, this improvement also leads to an increase in the number of boundaries of nickel, stabilized zirconia and pores, i.e., three-phase boundaries, which are known as reaction sites of fuels. Consequently, the electrochemical reaction is facilitated and the output characteristics are improved.

There is a known technique to improve such output characteristics in which nickel oxide and stabilized zirconia having a stabilized phase are pulverized and mixed using a media mill, such as a ball mill, to manufacture an anode material (Patent Literature 1).

However, in the anode material obtained by this technique, an impairment of nickel dispersibility may be observed due to the difference in specific gravity between the nickel oxide and the stabilized zirconia, and due to electrostatic aggregation of the particles. For example, particles having a submicron size of less than 1 µm cause a problem of remarkable electrostatic aggregation. In the case of particles having a particle diameter of about several microns, the sedimentation rate of the particles increase, and the nickel oxide and stabilized zirconia are separated from each other due to the difference in specific gravity, resulting in significant deterioration in the nickel dispersibility.

In view of these problems, Patent Literature 2 proposes a technique for improving nickel dispersibility, in which materials are mixed in an aqueous solution having a predetermined pH value so as to increase the electrostatic repulsive force of the particles of each material, thereby preventing aggregation among particles of the same material. In addition, in this technique, the electrostatic charge is set to be opposite for different materials so as to cause the particles of different materials to aggregate, thereby improving the nickel dispersibility. Generally, when oxide particles are dispersed in a polar solvent, such as water, the particle surfaces adsorb hydroxyl groups, and, as a result, the dispersion stability is enhanced by solvation.

However, the hydroxyl groups tend to be present on the particle surfaces in a non-uniform manner. Therefore, when particle bombardment due to thermal motion is repeated, particles easily aggregate due to the non-uniform presence of hydroxyl groups. Thus, in addition to aggregation between the nickel oxide and stabilized zirconia, electrostatic aggregation occurs among particles of the same material (nickel oxide particles, or stabilized zirconia particles), leading to insufficient nickel dispersibility in the obtained composite oxide.

Further, since the true density of the nickel oxide and stabilized zirconia is so higher than that of the solvent, separation due to particle sedimentation is likely to occur. In addition, since the particle size is enlarged due to electrostatic aggregation, the separation becomes more significant, leading to insufficient nickel dispersibility in the obtained composite oxide.

Patent Literature 3 discloses an attempt to micronize nickel and uniformly disperse nickel oxide with a spray pyrolysis method using an aqueous solution obtained by dissolving a water-soluble nickel salt and a water-soluble zirconium salt.

However, in this technique, there is a significant difference in the precipitation rate between the nickel salt and the zirconium salt resulting from the difference in their solubility in the solvent. This causes a problem in that the nickel oxide is not dispersed uniformly in the composite oxide. In addition, depending on the types of water-soluble nickel salt and water-soluble zirconium salt, a large amount of acid gas is generated upon thermal decomposition, which makes it difficult to manufacture the composite oxide.

CITATION LIST

Patent Literature

PTL 1: Japanese Unexamined Patent Publication No. 2004-327278
PTL 2: Japanese Unexamined Patent Publication No. 2007-080542
PTL 3: Japanese Unexamined Patent Publication No. 2003-197219

SUMMARY OF INVENTION

Technical Problem

An object of the present invention is to provide a nickel oxide-stabilized zirconia composite oxide in which nickel is dispersed uniformly, a process for easily producing the composite oxide, and an anode for a solid oxide fuel cell having excellent output characteristics.

Solution to Problem

The inventors of the present invention conducted extensive research and found that the above-described object can be achieved by employing a specific nickel compound and stabilized zirconium compound, and also employing a specific production process.

The present invention relates to a nickel oxide-stabilized zirconia composite oxide, a process for producing the composite oxide, and an anode for a solid oxide fuel cell comprising the composite oxide, which are described hereinbelow.

Item 1. A nickel oxide-stabilized zirconia composite oxide obtained by sintering a mixture of nickel hydroxide and/or nickel carbonate and stabilized zirconium hydroxide.

Item 2. The nickel oxide-stabilized zirconia composite oxide according to Item 1, which has an extrapolated onset temperature, at which weight loss of the composite oxide starts, within a range of from 300° C. or more to 450° C. or less when the temperature of the composite oxide is raised from room temperature by 10° C./min in a thermogravimetric analysis conducted by supplying hydrogen gas at a flow rate of 100 ml/min.

Item 3. The nickel oxide-stabilized zirconia composite oxide according to Item 1, which has an extrapolated onset temperature, at which weight loss of the composite oxide starts, within a range of from 320° C. or more to 450° C. or less when the temperature of the composite oxide is raised from room temperature by 10° C./min in a thermogravimetric analysis conducted by supplying hydrogen gas at a flow rate of 100 ml/min.

Item 4. The nickel oxide-stabilized zirconia composite oxide according to any one of Items 1 to 3, where the weight ratio of nickel to stabilized zirconium in the composite oxide on an oxide basis is nickel oxide/stabilized zirconia=1/9 to 9/1.

Item 5. An anode for a solid oxide fuel cell comprising the nickel oxide-stabilized zirconia composite oxide of any one of Items 1 to 4.

Item 6. A process for producing a nickel oxide-stabilized zirconia composite oxide comprising:

mixing a nickel hydroxide and/or nickel carbonate with a stabilized zirconium hydroxide; and sintering the mixture.

The nickel oxide-stabilized zirconia composite oxide of the present invention is characterized in that it can be produced by sintering a mixture of a nickel hydroxide and/or nickel carbonate and a stabilized zirconium hydroxide.

In the present invention, the nickel hydroxide and/or nickel carbonate, and stabilized zirconium hydroxide are used instead of conventionally used nickel oxide and stabilized zirconia, to produce the composite oxide. Accordingly, it is possible to prevent or suppress the aggregation of the particles of each compound, and a sedimentation phenomenon that occurs when the nickel hydroxide is mixed. As a result, it is possible to improve nickel dispersibility in the composite oxide.

A nickel hydroxide and/or nickel carbonate having Gibbs free energy lower than the conventionally used nickel oxide, and a stabilized zirconium hydroxide having Gibbs free energy lower than the zirconium oxide, are used as raw materials, and mixed together, to obtain a precursor that has high nickel dispersibility. By sintering the resulting precursor, a composite oxide having improved nickel dispersibility as compared to conventional types can be obtained.

It is commonly known that chemical species have Gibbs free energy specific to their respective species, and that the lower the Gibbs free energy value, the more stable the chemical species in terms of thermodynamics. That is, if there exists a chemical equilibrium between two chemical species, the equilibrium shifts toward a chemical species having a lower Gibbs free energy. In addition, it is also known that, in general sintering behavior such as that observed in calcining fine ceramics, unstable particles in a compound usually stabilize by aggregating to form coarse particles. That is, unstable particles tend to proceed in the direction of becoming coarse particles in order to reduce their specific surface area. Accordingly, it is believed that this sintering behavior has some impact on the dispersion behavior of the particles, similar to thermodynamic behavior. Therefore, if a nickel chemical species having Gibbs free energy lower than the conventionally used nickel oxide (−62 kcal/mol), and a zirconium chemical species having Gibbs free energy lower than the conventionally used zirconium oxide (−262 kcal/mol) are used as raw materials, i.e., if chemical species that are more stable than the conventionally used chemical species are employed, a composite oxide having a higher nickel dispersibility than conventional types can be obtained. Specifically, the Gibbs free energy of nickel hydroxide is −134 kcal/mol, and the Gibbs free energy of nickel carbonate is −165 kcal/mol. Other than these, nickel sulfate and nickel chloride are also nickel compounds, but due to their high deliquescence and water solubility, it is difficult to produce a composite oxide using these compounds. The Gibbs free energy of zirconium hydroxide is −338.6 kcal/mol.

The above-described Gibbs free energy values are those obtained at 25° C., and are calculated by using values cited from "The Oxidation States of the Elements and Their Potentials in Aquerious Solutions 1952, by Wendell M. Latimer".

As described above, an oxide compound becomes dispersed in an aqueous solvent by the addition of hydroxyl groups to the particle surface, and the consequent solvation. However, because the hydroxyl groups are non-uniformly present on the oxide surface, a slight interference, such as thermal motion, accelerates particle aggregation due to the imbalance in the site where the hydroxyl groups are present. In contrast, the raw material used in the present invention is a basic salt made of a metallic element and hydroxyl groups, and many hydroxyl groups are distributed to the particle surface uniformly. Thus, the solvation in the aqueous solvent occurs easily. In addition, the retentivity of the nickel hydroxide in a dispersed state in the precursor is excellent as compared to conventional techniques. The nickel carbonate used in the present invention is easily converted to nickel hydroxide in the aqueous solvent.

Further, the chemical species used in the present invention characteristically have a lower true density as compared to the conventionally used raw materials. By using raw materials that have a low true density, it is possible to lower the sedimentation rate. Specifically, it is known that the sedimentation rate of raw materials (particles) in a mixing process depends on the true density of the particles, as defined by Stokes' formula below.

$$U = \frac{\rho_p - \rho_0}{18\eta} d_p^2 g \quad \text{(Stokes の式)} \qquad \text{[Math. 1]}$$

U: sedimentation rate, $\rho_p$: particle density, $\rho_0$: dispersion-medium density, $\eta$: dispersion-medium viscosity, $d_p$: particle diameter, and g: gravitational acceleration When the sedimentation rate is high, mixed particles are re-separated due to the sedimentation phenomenon, lowering the nickel oxide dispersibility. In contrast, the present invention uses nickel hydroxide and/or nickel carbonate, and zirconium hydroxide, which all have a low true density, so the sedimentation rate is lowered. In addition, this suppresses the nickel compound from re-separating in the process of mixing the nickel compound and zirconium compound as compared to conventional techniques. The range of the true density is not particularly limited, but is preferably from 2.0 to 4.4 g/cc.

Specifically, the true density of nickel hydroxide is 4.10 g/cc, that of nickel carbonate is 4.36 g/cc, and that of zirconium hydroxide is 3.47 g/cc.

In this specification, "true density" means the value measured by a gas displacement method using helium gas. The measurement was conducted using a dry type automatic density meter (manufactured by Shimadzu Corporation, model number: AccuPyc 1330).

Process for Producing a Nickel Oxide-Stabilized Zirconia Composite

The shapes of the nickel hydroxide and the nickel carbonate are not particularly limited; however, granular is preferable.

When the nickel hydroxide and the nickel carbonate are granular, the mean particle diameter thereof is preferably about 0.1 to 20 μm in terms of grinding efficiency. The nickel hydroxide and the nickel carbonate are preferably those having a regular particle-size distribution and shape.

The nickel hydroxide and the nickel carbonate can be readily obtained from commercially available products or by production according to a known method.

A hydroxide of stabilized zirconium has a hydroxyl group uniformly present on the surface of stabilized zirconium.

The stabilized zirconium preferably comprises at least one stabilizing element selected from the group consisting of Mg, Ca, Y, Sc and Ce replaced with zirconium in the form of a solid solution, and more preferably Y and/or Sc is dissolved in zirconium in the form of a solid solution.

The hydroxide of stabilized zirconium can be obtained from commercially available products or by production according to a known method. An example of a known method to obtain a hydroxide of stabilized zirconium is one in which a zirconium salt and a salt containing a stabilizing element are dissolved in water to obtain a solution, the resulting solution is added to an aqueous ammonia to obtain a precipitate, and the precipitate is then subjected to filtration and washed with water.

An example of a zirconium salt is zirconium nitrate. Examples of salts containing a stabilizing element include yttrium nitrate, scandium nitrate, cerium nitrate and the like. The concentration of the solution may be selected within the range of from 1 to 20 wt %. The concentration of the aqueous ammonia is not particularly limited but is preferably about 1 wt %.

The mixing ratio of nickel hydroxide and/or nickel carbonate to a hydroxide of stabilized zirconium is not particularly limited. However, the weight ratio of nickel to stabilized zirconium in the resulting composite oxide on an oxide basis (nickel oxide/stabilized zirconia) is preferably about 1/9 to 9/1, and more preferably about 4/6 to 8/2. By setting the mixing ratio within such a range, the dispersibility of nickel in the composite oxide can be remarkably improved. This makes it possible to obtain a composite oxide exhibiting sufficient conductivity and power-generating output.

An example of a method for mixing nickel hydroxide and/or nickel carbonate with a hydroxide of stabilized zirconium is to mix nickel hydroxide and/or nickel carbonate with a hydroxide of stabilized zirconium while grinding using a known grinding equipment.

Examples of grinding equipments include a ball mill, a vibration mill, a bead mill, a jet mill and the like.

Alternatively, wet-mixing may be conducted by adding stabilized zirconium to a dispersion comprising nickel hydroxide and/or nickel carbonate dispersed in water. During the wet-mixing, the nickel carbonate is suitably converted into nickel hydroxide. The concentration of the slurry obtained by wet-mixing is not particularly limited; however, it is preferable that the concentration of a uniform slurry be about 20 to 50%. If the concentration exceeds 50%, the slurry has too high viscosity undesirably, it causes the reduction of the operation efficiency. If the concentration is less than 20%, the powder yield per unit volume during the drying is undesirably low.

After wet-mixing, if necessary, the resulting slurry may be uniformly dried. For drying, a spray dryer, mist dryer or like spray dryer is preferably used.

In order to reduce the number of production steps, it is desirable that the nickel hydroxide and/or nickel carbonate be subjected to grinding and mixing together with the hydroxide of stabilized zirconium at one time.

A nickel oxide-stabilized zirconia composite is obtained by sintering the mixture (precursor) thus obtained. In the present invention, after mixing nickel hydroxide and/or nickel carbonate with a hydroxide of stabilized zirconium, the resulting mixture is sintered. More specifically, by sintering the nickel hydroxide and/or nickel carbonate and the hydroxide of stabilized zirconium simultaneously, dispersibility of the nickel in the composite oxide can be remarkably improved. Thermal diffusion during sintering is believed to further improve the dispersibility of the nickel. During the sintering, the generation of water probably proceeds due to hydroxyl group elimination.

Ordinarily, sintering converts the stabilizing element contained in the stabilized zirconium to an oxide. For example, Mg, Ca, Y, Sc and Ce are converted into MgO, CaO, $Y_2O_3$, $Sc_2O_3$, and $CeO_2$, respectively.

The sintering temperature is preferably about 800 to 1200° C. If the sintering temperature is less than 800° C., there is a risk that, in producing an anode using the resulting composite oxide, when the composite oxide is sintered onto a solid electrolyte plate, the composite oxide may separate from the solid electrolyte due to the difference in thermal contraction. If the sintering temperature exceeds 1200° C., the nickel oxide is coarsened and its electroconductivity tends to be decreased.

The sintering time is not particularly limited and may be suitably selected depending on the sintering temperature and the like.

The sintering atmosphere is not particularly limited as long as oxygen is present.

In sintering, a known sintering furnace may be used. Examples of known sintering furnaces include an electric furnace (muffle furnace), a gas furnace and the like.

After sintering, the resulting composite oxide may be ground if necessary. The grinding and mixing method described above may be employed as the grinding method.

Nickel Oxide-Stabilized Zirconia Composite

By sintering the mixture (precursor) of nickel hydroxide and/or nickel carbonate and a hydroxide of stabilized zirconium, the nickel oxide-stabilized zirconia composite of the present invention can be obtained.

In the composite oxide, the nickel and the stabilized zirconium are finely and uniformly distributed.

In the composite oxide, the stabilizing element is usually present in the form of an oxide. The oxide of the stabilizing element contained in the composite oxide is preferably at least one member selected from the group consisting of MgO, CaO, $Y_2O_3$, $Sc_2O_3$ and $CeO_2$, because they are suitable for obtaining an anode having a high ion conductivity. In particular, the composite oxide of the present invention preferably comprises yttria-stabilized zirconia and/or scandia-stabilized zirconia as the stabilized zirconia. An yttria-stabilized zirconia having a cubic crystal phase is preferably used as the yttria-stabilized zirconia described above. An example of an yttria-stabilized zirconia having a cubic phase is a zirconium comprising 8 mol % of yttria in the form of a solid solution. In order to obtain an anode having a high ion conductivity, the scandia-stabilized zirconia preferably comprises, for example, 10 mol % of scandium oxide and 1 mol % of cerium oxide dissolved in zirconium in the form of a solid solution.

The shape of the composite oxide is not particularly limited; however, granular is preferable.

When the composite oxide is granular, the mean particle diameter of the composite oxide is not particularly limited and may be suitably selected so as to ease its processability into an anode as described below.

The weight ratio of the nickel to the stabilized zirconium in the composite oxide on an oxide basis is preferably nickel oxide/stabilized zirconia=about 1/9 to 9/1, and more preferably about 4/6 to 8/2.

The space group in the composite oxide is preferably Fm3m or Fm-3m.

In a thermogravimetric analysis conducted by supplying hydrogen gas at a flow rate of 100 ml/min, the composite oxide preferably has an extrapolated onset temperature, at which weight loss starts, within the range of from 300° C. or more to 450° C. or less, and more preferably from 320° C. or more to 450° C. or less, when the temperature of the composite oxide is raised from room temperature by 10° C./min. The aforementioned range of the extrapolated onset temperature, i.e., from 300° C. or more to 450° C. or less, is higher than that of a conventional composite oxide. Therefore, the composite oxide of the present invention is desirable as a material for the fuel electrode of a solid oxide fuel cell due to its slow reduction speed. This is because when the reduction speed is slow, the aggregation of metal nickel due to the reduction of nickel oxide is suppressed. More specifically, because the metal nickel is maintained in a fine state, the area of nickel catalyst is increased, and the power density is thereby improved. The results of the thermogravimetric analysis in the present specification were obtained using a thermo gravimetry differential thermal analyzer ("Thermo Plus PS1500" manufactured by Rigaku Corporation).

The extrapolated onset temperature (Tg) in this specification is as defined by JIS K0129. More specifically, in a thermogravimetric analysis conducted by supplying hydrogen gas at a flow rate of 100 ml/min., the extrapolated onset temperature (Tg) is the point where the baseline extending from the lower temperature toward the high temperature side intersects the tangential line drawn from the point where the gradient of weight loss due to the reduction of nickel oxide becomes maximum toward the lower temperature side. This is explained in detail with reference to FIGS. 1 and 2 below.

FIGS. 1 and 2 show an example of a temperature-weight curve obtained by thermogravimetric analysis. In FIG. 1, the curve has a gradient based on the weight loss of the sample from the flexion point P. The reduction of nickel oxide in the sample starts at flexion point P, and the sample then enters the oxide phase-metallic phase change period B. The reaction continues until the nickel oxide in the sample is completely reduced. The explanation continues with reference to FIG. 2. In oxide phase period A of 200° C. to flexion point P, the tangential line La of temperature-weight curve A is drawn from the temperature a where the absolute value of DTG, which is expressed as the value of the change in weight differentiated with respect to time, is lowest toward the higher temperature side (toward the right side). This line is defined as the baseline. Subsequently, in phase change period B in which the phase change between the oxide phase and metallic phase is observed, the tangential line Lb of the temperature-weight curve is extended toward the lower temperature side (i.e., toward the left side) from the temperature b where DTG, i.e., the gradient of temperature-weight curve A, is maximum. The point where La and Lb intersect is defined as extrapolated onset temperature Tg.

Anode for a Solid Oxide Fuel Cell

The anode for a solid oxide fuel cell of the present invention comprises the nickel oxide-stabilized zirconia composite. By containing the composite oxide, the anode of the invention exhibits excellent electron conductivity and ion conductivity while in operation, achieving excellent output characteristics.

The anode of the present invention may have the same structure as that of a known anode except that it comprises the composite oxide.

The content of the composite oxide in the anode is not limited, however, about 80 to 100 wt % is preferable. The anode may contain known additives other than the composite oxide as long as they do not hamper the effects of the invention.

The method for producing the anode is not particularly limited, and a method that is similar to a known method can be employed except that the composite oxide described above is used. For example, after dispersing the composite oxide on the surface of the solid electrolyte plate by screen-printing, the dispersion is sintered thereon. The content of the composite oxide in the dispersion is not particularly limited, and may be suitably adjusted depending on the size and the like of the fuel cell. There is no particular limitation to the sintering conditions, and sintering may be suitably adjusted depending on the size and the like of the fuel electrode based on a known method so as to desirably obtain an anode.

Advantageous Effects of Invention

In the present invention, by using nickel hydroxide and/or nickel carbonate as well as a hydroxide of stabilized zirconium to produce a composite oxide, it is possible to prevent or suppress the aggregation of the particles of a single type of compound, and a sedimentation phenomenon that occurs when the nickel hydroxide is mixed. As a result, it is possible to improve nickel dispersibility in the composite oxide.

By sintering nickel hydroxide and/or nickel carbonate simultaneously with a hydroxide of stabilized zirconium, dispersibility of the nickel in the composite oxide can be remarkably improved. In this case, the dispersibility of the nickel is probably further improved by thermal diffusion during the sintering.

When the weight ratio of the nickel to the stabilized zirconium, i.e., nickel oxide/stabilized zirconia, in the composite oxide of the present invention on an oxide basis is 1/9 to 9/1, the dispersibility of the nickel in the composite oxide is remarkably improved.

Furthermore, the method for producing the composite oxide of the present invention allows the composite oxide to be readily produced while preventing the generation of acidic gas.

DESCRIPTION OF EMBODIMENTS

Figure 1:
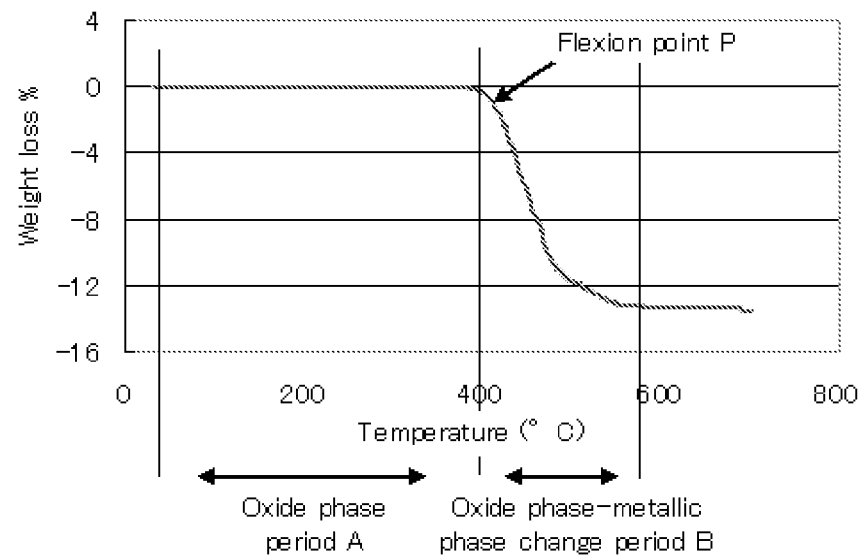
FIG. 1 shows an example of the temperature-weight curve obtained by subjecting a composite oxide to thermogravimetric analysis.
Figure 2:
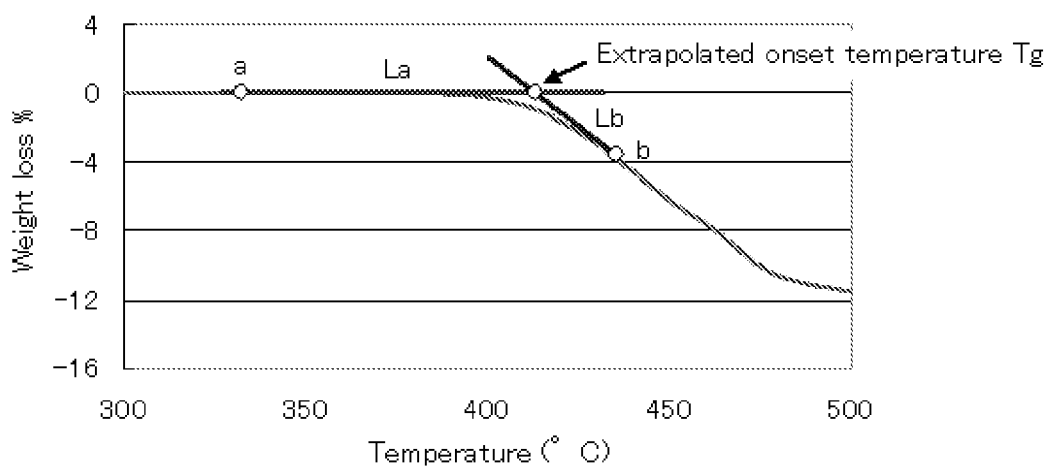
FIG. 2 shows an example of the temperature-weight curve obtained by subjecting a composite oxide to thermogravimetric analysis.

Hereunder, the present invention is explained in detail with reference to Examples and Comparative Examples. However, the scope of the invention is not limited to the Examples.

EXAMPLE 1

Nickel hydroxide having a mean particle diameter of 10 μm (manufactured by Tanaka Chemical Corporation) was ground by a wet mill to a mean particle diameter of 0.2 μm. The ground nickel hydroxide and a hydroxide of 10Sc1CeSZ (manufactured by Daiichi Kigenso Kagaku Kogyo Co.) were then wet-mixed in a proportion of NiO:10Sc1CeSZ=60:40, based on the weight ratio when converted to oxides. Here, 10Sc1CeSZ refers to scandia-stabilized zirconia (manufactured by Daiichi Kigenso Kagaku Kogyo Co.) containing 10 mol % of $Sc_2O_3$ and 1 mol % of $CeO_2$.

Thereafter, the resulting slurry was dried and sintered at 1000° C. under air for 3 hours.

A nickel oxide-stabilized zirconia composite (mean particle diameter: 41.3 μm) was thus produced by the above method. Thermogravimetric analysis of this composite oxide, which was conducted by supplying hydrogen gas at a flow rate of 100 ml/min, showed that the extrapolated onset temperature of weight loss, at which weight loss of the composite oxide starts that occurred when the composite oxide was heated at a temperature that started with room temperature and increased by 10° C./min was 401.2° C., as calculated by the method described above. (In the following Examples and Comparative Examples, the extrapolated onset temperatures were calculated using the same method.)

EXAMPLE 2

A nickel oxide-stabilized zirconia composite (mean particle diameter: 43.2 μm) was produced in the same manner as in Example 1 except that nickel hydroxide and a hydroxide of 10Sc1CeSZ were used in a proportion of NiO:10Sc1CeSZ=40:60, based on the weight ratio when converted to oxides. The composite oxide had an extrapolated onset temperature of 404.8° C.

EXAMPLE 3

A nickel oxide-stabilized zirconia composite (mean particle diameter: 9.78 μm) was produced in the same manner as in Example 1 except that a hydroxide of 8YSZ (manufactured by Daiichi Kigenso Kagaku Kogyo Co.) was used instead of a hydroxide of 10Sc1CeSZ. The composite oxide had an extrapolated onset temperature of 390.9° C. Here, 8YSZ refers to yttria-stabilized zirconia (manufactured by Daiichi Kigenso Kagaku Kogyo Co.) containing 8 mol % of $Y_2O_3$.

EXAMPLE 4

A nickel oxide-stabilized zirconia composite (mean particle diameter: 7.91 μm) was produced in the same manner as in Example 3 except that nickel hydroxide and a hydroxide of 8YSZ were used in a proportion of NiO:8YSZ=40:60, based on the weight ratio when converted to oxides. The composite oxide had an extrapolated onset temperature of 385.0° C.

EXAMPLE 5

Nickel hydroxide (manufactured by Tanaka Chemical Corporation) having a mean particle diameter of 10 μm and a hydroxide of 10Sc1CeSZ (manufactured by Daiichi Kigenso Kagaku Kogyo Co.) were wet mixed in a proportion of NiO:10Sc1CeSZ=60:40, based on the weight ratio when converted to oxides, followed by wet grinding.

Thereafter, the slurry thus obtained was dried and sintered at 1000° C. under air for 3 hours.

A nickel oxide-stabilized zirconia composite (mean particle diameter: 56.0 μm) was produced by the method described above. The composite oxide had an extrapolated onset temperature of 410.8° C.

EXAMPLE 6

A nickel oxide-stabilized zirconia composite (mean particle diameter: 52.5 μm) was produced in the same manner as in Example 5 except that nickel hydroxide and a hydroxide of 10Sc1CeSZ were used in a proportion NiO:10Sc1CeSZ=40:60, based on the weight ratio when converted to oxides. The composite oxide had an extrapolated onset temperature of 420.4° C.

EXAMPLE 7

A nickel oxide-stabilized zirconia composite (mean particle diameter: 8.09 μm) was produced in the same manner as in Example 5 except that a hydroxide of 8YSZ (manufactured by Daiichi Kigenso Kagaku Kogyo Co.) was used instead of a hydroxide of 10Sc1CeSZ. The composite oxide had an extrapolated onset temperature of 391.8° C.

EXAMPLE 8

A nickel oxide-stabilized zirconia composite (mean particle diameter: 6.89 μm) was produced in the same manner as in Example 7 except that nickel hydroxide and a hydroxide of 8YSZ were used in a proportion of NiO:8YSZ=40:60, based on the weight ratio when converted to oxides. The composite oxide had an extrapolated onset temperature of 389.5° C.

EXAMPLE 9

The nickel oxide-stabilized zirconia composite produced in Example 5 was wet ground and dried to obtain a mean particle diameter of 0.43 μm. The ground composite oxide had an extrapolated onset temperature of 334.8° C.

EXAMPLE 10

The nickel oxide-stabilized zirconia composite produced in Example 6 was wet ground and dried to obtain a mean particle diameter of 0.37 μm. The ground composite oxide had an extrapolated onset temperature of 340.6° C.

EXAMPLE 11

The nickel oxide-stabilized zirconia composite produced in Example 7 was wet ground and dried to obtain a mean particle diameter of 0.50 μm. The ground composite oxide had an extrapolated onset temperature of 347.0° C.

EXAMPLE 12

The nickel oxide-stabilized zirconia composite produced in Example 8 was wet ground and dried to obtain a mean particle diameter of 0.44 μm. The ground composite oxide had an extrapolated onset temperature of 342.1° C.

COMPARATIVE EXAMPLE 1

Each of the nickel hydroxides (manufactured by Tanaka Chemical Corporation) used in Examples 1 to 8 was sintered at 1000° C. under air for 3 hours, wet ground, and then dried to obtain a nickel oxide. The nickel oxide thus obtained was mixed with 10Sc1CeSZ in a proportion of NiO: 10Sc1CeSZ=60:40, based on the weight ratio when converted to oxides. The mixture was ground using a ball mill to such an extent that the nickel oxide and 10Sc1CeSZ had a mean particle diameter of 0.2 µm, followed by drying.

A nickel oxide-stabilized zirconia composite (mean particle diameter: 0.52 µm) was produced by the above method. The composite oxide had an extrapolated onset temperature of 277.8° C.

COMPARATIVE EXAMPLE 2

A nickel oxide-stabilized zirconia composite (mean particle diameter: 0.49 µm) was produced in the same manner as in Comparative Example 1 except that NiO and 10Sc1CeSZ were mixed in a proportion of NiO:10Sc1CeSZ=40:60. The composite oxide had an extrapolated onset temperature of 280.1° C.

COMPARATIVE EXAMPLE 3

A nickel oxide-stabilized zirconia composite (mean particle diameter: 0.55 µm) was produced in the same manner as in Comparative Example 1 except that 8YSZ (manufactured by Daiichi Kigenso Kagaku Kogyo Co.) was used instead of the oxide of 10Sc1CeSZ. The composite oxide had an extrapolated onset temperature of 292.3° C.

COMPARATIVE EXAMPLE 4

A nickel oxide-stabilized zirconia composite (mean particle diameter: 0.43 µm) was produced in the same manner as in Comparative Example 3 except that the nickel oxide and the oxide of 8YSZ were mixed in a proportion of NiO: 8YSZ=40:60, based on the weight ratio when converted to oxides. The composite oxide had an extrapolated onset temperature of 295.9° C.

TEST EXAMPLE 1

Production of a Solid Oxide Fuel Cell

A solid oxide fuel cell was produced under the following conditions.

Using each of the nickel oxide-stabilized zirconia composites obtained in Examples 1-12 and Comparative Examples 1-4, 16 types of anodes were prepared.
Cell Shape
Cell diameter: 20 mmφ
Electrolyte thickness: 500 µm
Area of each electrode: 0.64 cm²
Electrolyte: 10Sc1CeSZ (manufactured by Daiichi Kigenso Kagaku Kogyo Co.)
Cathode: LSM-80F (manufactured by Daiichi Kigenso Kagaku Kogyo Co.) and 10Sc1CeSZ (manufactured by Daiichi Kigenso Kagaku Kogyo Co.) were mixed in a proportion of 1:1 based on the weight ratio
Cell Production Conditions
1) Electrolyte
  1)-1 Molding: After press molding, a CIP treatment was conducted (CIP pressure: 1.3 t/cm²)
  2)-2 Sintering: 1500° C.×2 hr
  3)-3 Processing:
    Top and bottom surfaces→Surface grinding
    Outside diameter→Cylindrical grinding
2) Anode
  Screen mask: ST#165, Emulsion thickness: 20 µm
  Printing times: twice
  Sintering: 1300° C.×2 hr
3) Cathode
  Screen mask: ST#165, Emulsion thickness: 20 µm
  Printing times: twice
  Sintering: 1200° C.×2 hr
Power Generation Test The solid oxide fuel cell thus produced was set in a measuring instrument which was then placed in an electric furnace, and the temperature in the electric furnace was increased to 1000° C. When the temperature reached 1000° C., nitrogen gas was flowed at 150 (ml/min) for 10 to 20 minutes. Thereafter, a mixed gas of H₂:N₂=5:95 was flowed to the anode side and an air gas was flowed at 150 (ml/min) to the cathode side. This condition was maintained until the electromotive force of the single cell became stable. Thereafter, the temperature was decreased to 800° C., and an I-V (current-voltage) measurement was conducted.

The I-V measurement was conducted in the following manner. The current value was adjusted to the target value (200 mA/cm²) using a galvanostat, and that current value was maintained for 30 minutes. By multiplying the thus-obtained terminal voltage by the current value, the power density was obtained. The power densities thus obtained were shown as the relative comparisons between the Examples and the Comparative Examples after suitably adjusting their weight ratios of nickel oxide to stabilized zirconia, and the amounts of stabilized zirconia used.

Examples 1, 5 and 9 were compared to Comparative Example 1, Examples 2, 6 and 10 were compared to Comparative Example 2, Examples 3, 7 and 11 were compared to Comparative Example 3, and Examples 4, 8 and 12 were compared to Comparative Example 4.

As is clear from Table 1, the anodes produced using the composite oxides (the composite oxides of the present invention) of Examples 1 to 12 exhibited a relative power density that was higher than those that used the composite oxides of Comparative Examples 1 to 4 by 1 to 8%. In a solid oxide fuel cell, depending on the size of the device, several tens to several hundreds of cells are laminated; therefore, the difference in the relative power density becomes more remarkable.

TABLE 1

| Group | | Stabilized zirconia | Nickel oxide/ Stabilized zirconia | Mean particle diameter (µm) | Extrapolated onset temperature (° C.) | Relative power density (Relative comparison in group) |
|---|---|---|---|---|---|---|
| I | Example 1 | 10Sc1CeSZ | 60/40 | 41.3 | 401.2 | 101 |
|   | Example 5 |           |       | 56.0 | 410.8 | 104 |
|   | Example 9 |           |       | 0.43 | 334.8 | 106 |
|   | Comp. Ex. 1 |         |       | 0.52 | 277.8 | 100 |
| II | Example 2 | 10Sc1CeSZ | 40/60 | 43.2 | 404.8 | 101 |
|   | Example 6 |           |       | 52.5 | 420.4 | 103 |

TABLE 1-continued

| Group | | Stabilized zirconia | Nickel oxide/ Stabilized zirconia | Mean particle diameter (μm) | Extrapolated onset temperature (° C.) | Relative power density (Relative comparison in group) |
|---|---|---|---|---|---|---|
| | Example 10 | | | 0.37 | 340.6 | 106 |
| | Comp. Ex. 2 | | | 0.49 | 280.1 | 100 |
| III | Example 3 | 8YSZ | 60/40 | 9.78 | 390.9 | 102 |
| | Example 7 | | | 8.09 | 391.8 | 104 |
| | Example 11 | | | 0.50 | 347.0 | 103 |
| | Comp. Ex. 3 | | | 0.55 | 292.3 | 100 |
| IV | Example 4 | 8YSZ | 40/60 | 7.91 | 385.0 | 104 |
| | Example 8 | | | 6.89 | 389.5 | 107 |
| | Example 12 | | | 0.44 | 342.1 | 108 |
| | Comp. Ex. 4 | | | 0.43 | 295.9 | 100 |

The invention claimed is:

1. A process for producing a nickel oxide-stabilized zirconia composite oxide comprising:
   mixing a nickel hydroxide and/or nickel carbonate with a stabilized zirconium hydroxide with grinding or wet-mixing; and
   sintering the mixture.

* * * * *